United States Patent
Huang

(10) Patent No.: US 8,254,047 B2
(45) Date of Patent: Aug. 28, 2012

(54) VOICE COIL MOTOR

(75) Inventor: Chien-Feng Huang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/036,018

(22) Filed: Feb. 28, 2011

(65) Prior Publication Data

US 2012/0162792 A1   Jun. 28, 2012

(30) Foreign Application Priority Data

Dec. 24, 2010   (CN) .................................. 99 1 45758

(51) Int. Cl.
*H02K 41/03*   (2006.01)
(52) U.S. Cl. ....................... 359/824; 359/694; 310/12.16
(58) Field of Classification Search .................. 359/694, 359/824
See application file for complete search history.

(56) References Cited

U.S. PATENT DOCUMENTS

| | | | |
|---|---|---|---|
| 7,715,131 B2 * | 5/2010 | Chou et al. ..................... | 359/824 |
| 8,059,346 B2 * | 11/2011 | Henderson ..................... | 359/824 |
| 2010/0142065 A1 * | 6/2010 | Liao .............................. | 359/824 |

* cited by examiner

*Primary Examiner* — James Jones
(74) *Attorney, Agent, or Firm* — Altis Law Group, Inc.

(57) ABSTRACT

A voice coil motor includes a stationary member and a moveable member. The stationary member defines a central axis. The stationary member includes a first receiving room, four sidewalls surrounding the first receiving room and four guide rails formed on the respective sidewalls and located in the receiving room. The moveable member is received in the stationary frame. The moveable member includes a moveable frame. The moveable frame includes four side surfaces. A plurality of restricting posts extend from each side surface and are aligned in a line parallel to the corresponding guide rail. The restricting posts slidably engage in the corresponding guide rails.

9 Claims, 2 Drawing Sheets

VOICE COIL MOTOR

BACKGROUND

1. Technical Field

The present disclosure relates to lens actuators, and particularly, to a voice coil motor.

2. Description of Related Art

A voice coil motor is preferred for driving lenses along an optical axis in image capturing devices to achieve an auto-focus function of the image capturing device. A typical voice coil motor includes a moveable frame for accommodating a lens barrel with lenses therein, a coil wrapped around the moveable frame, a number of magnets, a stationary frame for fixing the magnets and accommodating the moveable frame, and a resilient plate. Glue interconnects the resilient plate, the stationary frame, and the moveable frame.

When a current is applied to the coil, the coil is excited to react with the magnets, producing a magnetic force to drive the moveable frame to move along the optical axis with the lens barrel. When the voice coil motor is dropped, the moveable frame may move along a direction perpendicular to the optical axis. This may easily break the resilient plate, which could decrease the stability of the voice coil motor.

Therefore, it is desirable to provide a voice coil motor, which can overcome or at least alleviate the above-mentioned problems.

DETAILED DESCRIPTION

Figure 1:
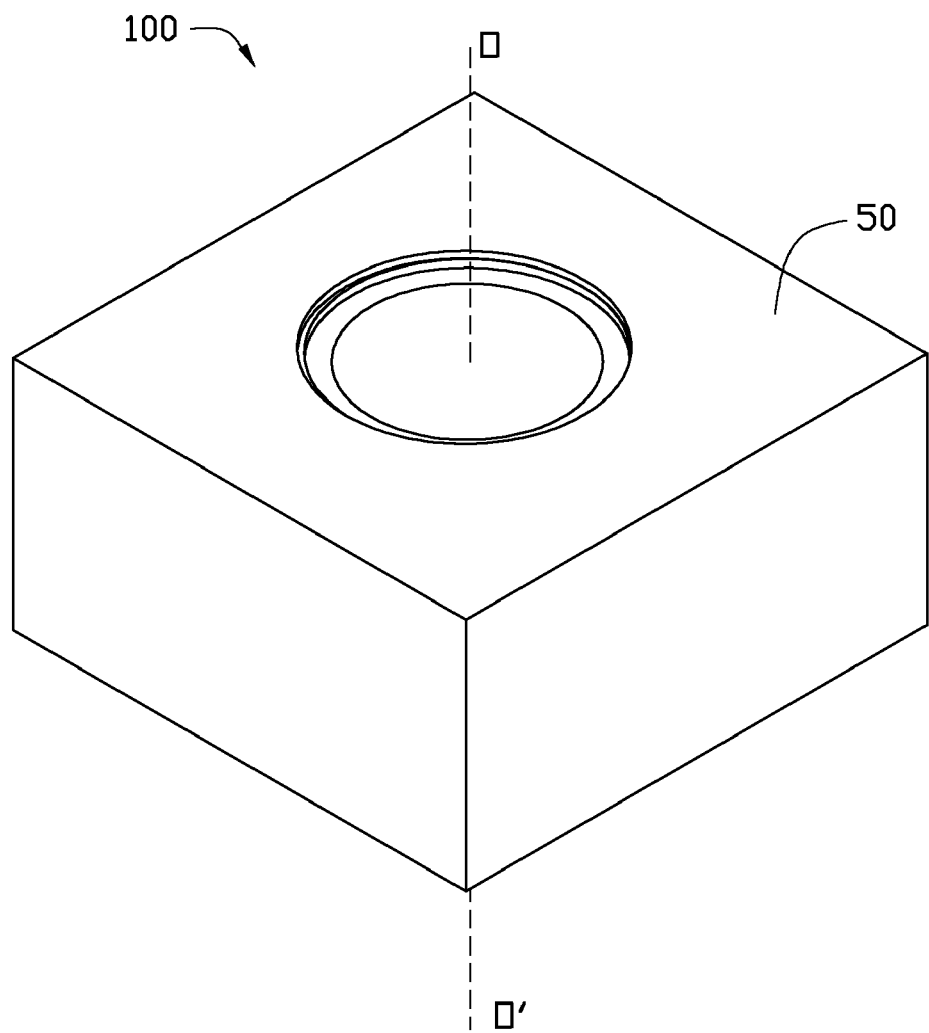
FIG. 1 is a schematic, isometric view of a voice coil motor, according to a first exemplary embodiment.
Figure 2:
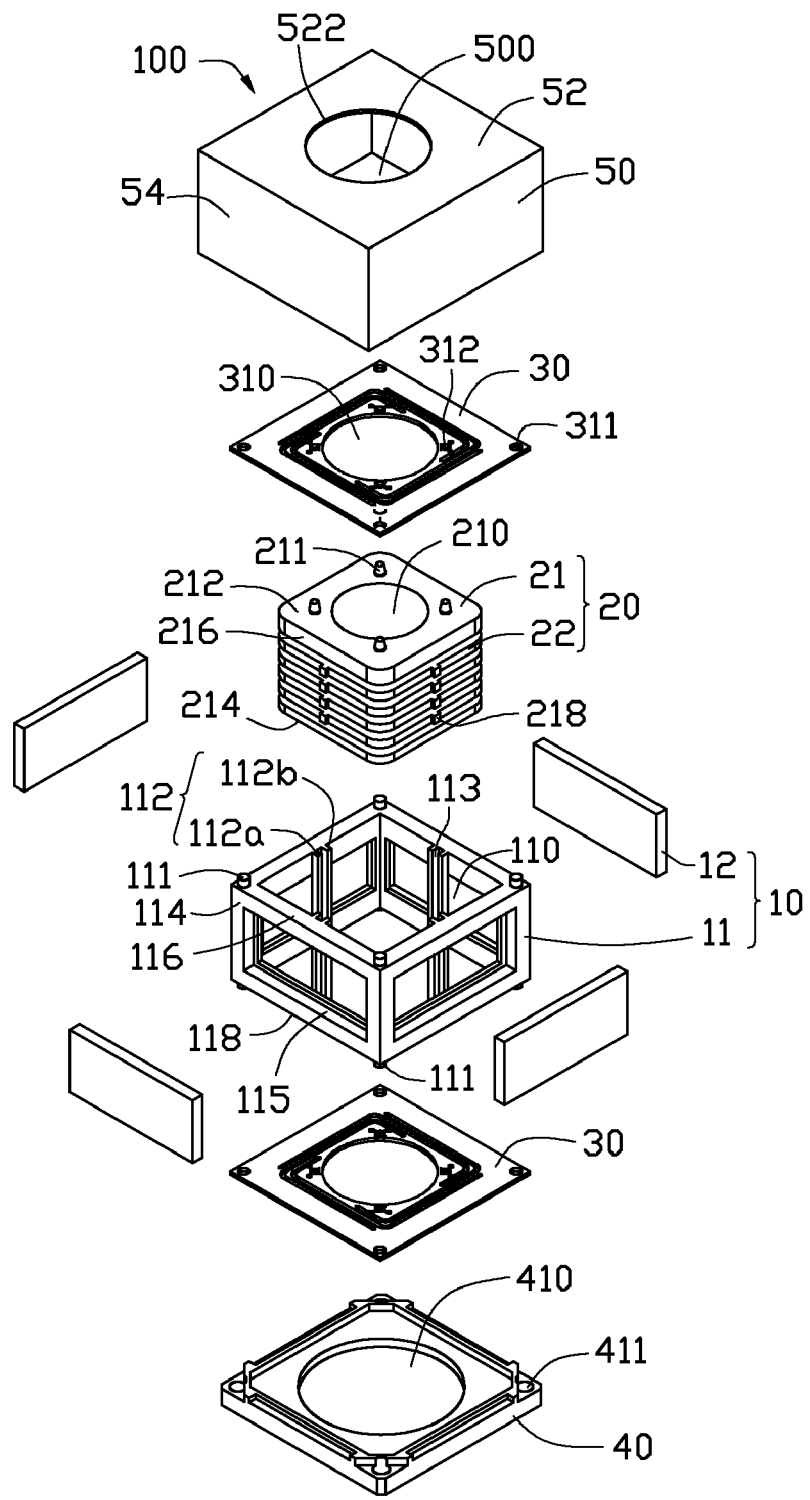
FIG. 2 is an exploded view of the voice coil motor of FIG. 1.

Referring to FIGS. 1-2, a voice coil motor 100, according to a first embodiment, includes a stationary member 10, a moveable member 20, two resilient plates 30, a base 40, and a housing 50.

The stationary member 10 includes a stationary frame 11 and four magnets 12. The stationary frame 11 is substantially a cube and defines a central axis OO' coinciding with a central axis of the voice coil motor 100. The stationary frame 11 includes four sidewalls 114, eight first locating posts 111, and four guide rails 112. The four sidewalls 114 cooperatively form a first receiving room 110. Each sidewall 114 defines a receiving holes 115 communicating with the first receiving room 110. Four first locating posts 111 extend from an upper surface 116 of the stationary frame 11, and other four locating posts 111 extend from a lower surface 118 of the stationary frame 11. Each of the four guide rails 112 is formed on the respective sidewalls 114 and located in the receiving room 110. Each guide rail 112 includes a first guide strip 112a substantially parallel to the central axis OO' and a second guide strip 112b substantially parallel to the first guide strip 112a. The first guide strip 112a and the second guide strip 112b cooperatively define a strip-shaped receiving groove 113. The four magnets 12 are fixed in the four receiving holes 115, respectively.

The moveable member 20 includes a moveable frame 21 and a coil 22 wrapped around the moveable frame 21. The moveable frame 21 is substantially a cube and defines a second receiving room 210 for receiving a lens module (not shown). The moveable frame 21 includes a top surface 212, a bottom surface 214 substantially parallel to the top surface 212, and four side surfaces 216 perpendicularly connecting the top surface 212 to the bottom surface 214. Four second locating posts 211 extend from the top surface 212. Four second locating posts 211 extend from the bottom surface 214. Four restricting posts 218 extend from each side surface 216. The four restricting posts 218 are aligned in a line parallel to the corresponding guide rail 112. The coil 22 wraps around moveable frame 21 and is interleaved with the restricting posts 218.

Each resilient plate 30 defines a light incident hole 310 corresponding to the second receiving room 210, four first locating holes 311 corresponding to the four first locating posts 111, and four second locating holes 312 corresponding to the four second locating posts 211.

The first locating posts 111 on the upper surface 116 extend through the first locating holes 311, and the resilient plate 30 is attached to the upper surface 116 by adhesive. The second locating posts 211 on the top surface 212 extend through the second locating holes 312, and the moveable frame 21 is attached to the resilient plate 30 by adhesive. The first locating posts 111 on the lower surface 118 extend through the first locating holes 311, and the resilient plate 30 is attached to the lower surface 118 by adhesive. The second locating posts 211 on the bottom surface 214 extend through the second locating holes 312, and the moveable frame 21 is attached to the resilient plate 30 by adhesive. Therefore, the moveable member 20 is suspended in the first receiving room 110 by the two resilient plates 30.

The base 40 is substantially a cube and defines a first through hole 410 in a central portion thereof and four fixing holes 411. The first through hole 410 is aligned with the light incident hole 310 and the second receiving room 210. The four fixing holes 411 surround the first through hole 410 and are defined at four corners of the base 40. The stationary member 10 and the moveable member 20 are supported on the base 40.

The housing 50 includes a top panel 52 and four side panels 54 extending from four peripheral sides of the top panel 52. The top panel 52 and the side panels 54 cooperatively define a third receiving room 500 for receiving the stationary member 10, the moveable member 20, the resilient plates 30, and the base 40. The top panel 52 defines a second through hole 522 in a central portion thereof. The second through hole 522 is aligned with the light incident hole 310, the second receiving room 210, and the first through hole 410. The housing 50 is made of electromagnetic shielded material, such as nickel alloy, conductive plastic, surface conductive material, conductive glass, or other suitable shielding material. The housing 50 is supported on the stationary member 10 and is configured for blocking contaminants such as dust and electromagnetic disturbance.

In assembly, the moveable member 20 is suspended in the first receiving room 110 by the two resilient plates 30. Every four restricting posts 218 engage in the corresponding strip-shaped receiving groove 113 and are apart from the guide rail 112. In this embodiment, the distance between the restricting posts 218 and the first guide strip 112a is less than or equal to 0.01 millimeters. The distance between the restricting posts 218 and the second guide strip 112b is less than or equal to 0.01 millimeters.

When the voice coil motor 100 is in operation, a current is applied to the coil 22, a magnetic force is produced between the magnets 12 and the coil 22, the moveable member 20 moves forward with the lens barrel, thereby achieving an auto-focus function. If the voice coil motor 100 is dropped, the guide rails 112 block the moveable member 20 from moving along a direction perpendicular to the central axis OO', thus protecting the two resilient plates 30 and increasing the stability of the voice coil motor 100.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A voice coil motor comprising:
a stationary member defining a central axis, the stationary frame comprising a first receiving room, four sidewalls surrounding the first receiving room and four guide rails formed on the respective sidewalls and located in the receiving room;
a moveable member received in the stationary frame, the movable member comprising a moveable frame, the moveable frame comprising four side surfaces, a plurality of restricting posts extending from each side surface and aligned in a line parallel to the corresponding guide rail, the restricting posts slidably engaging in the corresponding guide rails;
four magnets fixed in the four sidewalls of the stationary frame respectively; and
a coil wrapping around the moveable frame and interleaved with the restricting posts.

2. The voice coil motor as claimed in claim 1, wherein the guide rails are parallel to the central axis.

3. The voice coil motor as claimed in claim 2, wherein each guide rail comprises a first guide strip parallel to the central axis and a second guide strip parallel to the first guide strip, the first guide strip and the second guide strip form a strip-shaped receiving groove.

4. The voice coil motor as claimed in claim 3, wherein the distance between the restricting posts and the first guide strip is less than or equal to 0.01 millimeter, and the distance between the restricting posts and the second guide strip is less than or equal to 0.01 millimeter.

5. The voice coil motor as claimed in claim 1, further comprising two resilient plates, wherein the moveable member is suspended in the first receiving room by the two resilient plates.

6. The voice coil motor as claimed in claim 5, wherein the two resilient plates are fixedly attached on opposite sides of the stationary frame.

7. The voice coil motor as claimed in claim 6, further comprising a base, wherein the stationary frame and the moveable member are mounted on the base.

8. The voice coil motor as claimed in claim 7, further comprising a housing, wherein the housing encloses the stationary frame, the moveable member, the resilient plates, and the base.

9. A voice coil motor comprising:
a stationary frame defining a central axis, the stationary member comprising a first receiving room, four sidewalls surrounding the first receiving room and four guide rails formed on the respective sidewalls and located in the receiving room, the guide rails are parallel to the central axis; and
a moveable member received in the stationary frame, the movable member comprising a moveable frame, the moveable frame comprising four side surfaces, a plurality of restricting posts extending from each side surface and aligned in a line parallel to the corresponding guide rail, the restricting posts slidably engaging in the corresponding guide rails.

\* \* \* \* \*